United States Patent [19]

Kamimaru

[11] Patent Number: 5,765,528
[45] Date of Patent: Jun. 16, 1998

[54] IDLE SPEED CONTROL SYSTEM FOR AUTOMOTIVE INTERNAL COMBUSTION ENGINE

[75] Inventor: Shinji Kamimaru, Higashi-Kurume, Japan

[73] Assignee: Fuji Jukogyo Kabushiki Kaisha, Tokyo, Japan

[21] Appl. No.: 892,908

[22] Filed: Jul. 15, 1997

[30] Foreign Application Priority Data

Jul. 24, 1996  [JP]  Japan ........................... 8-194970

[51] Int. Cl.$^6$ ........................... F02D 41/16; F01L 9/04
[52] U.S. Cl. ................... 123/339.19; 123/90.11; 123/339.14
[58] Field of Search ............... 123/339.1, 339.14, 123/339.19, 339.2, 339.21, 339.22, 339.27, 90.11

[56] References Cited

U.S. PATENT DOCUMENTS

4,945,870  8/1990  Richeson ............... 123/90.11
5,115,782  5/1992  Klinke et al. ............... 123/90.11 X

*Primary Examiner*—Tony M. Argenbright
*Attorney, Agent, or Firm*—Beveridge, DeGrandi, Weilacher & Young L.L.P.

[57] ABSTRACT

During idling of an internal combustion engine, when there is a difference between an actual engine speed and a target idle speed which is preset in accordance with an engine load, the opening and closing timings of an intake/exhaust valve of the engine is changed in accordance with the difference between the actual engine speed and the target idle speed to change an intake air flow sucked into the engine. Therefore, it is not required to provide any apparatus, such as an ISC valve, provided in conventional systems, and it is possible to quickly adjust the engine speed so as to be equal to the target idle speed.

6 Claims, 9 Drawing Sheets

FIG. 10

IDLE SPEED CONTROL SYSTEM FOR AUTOMOTIVE INTERNAL COMBUSTION ENGINE

BACKGROUND OF THE INVENTION

The present invention relates generally to an idle speed control system for an automotive internal combustion engine. More specifically, the invention relates to an idle speed control system for an automotive internal combustion engine, which has an intake/exhaust valve control system for automatically controlling the opening and closing of an electromagnetic intake/exhaust valve.

As one of control systems for automotive internal combustion engines, there is an idle speed control system (which will be hereinafter referred to as an "ISC system") for maintaining a predetermined engine speed during idling.

Figure 1:
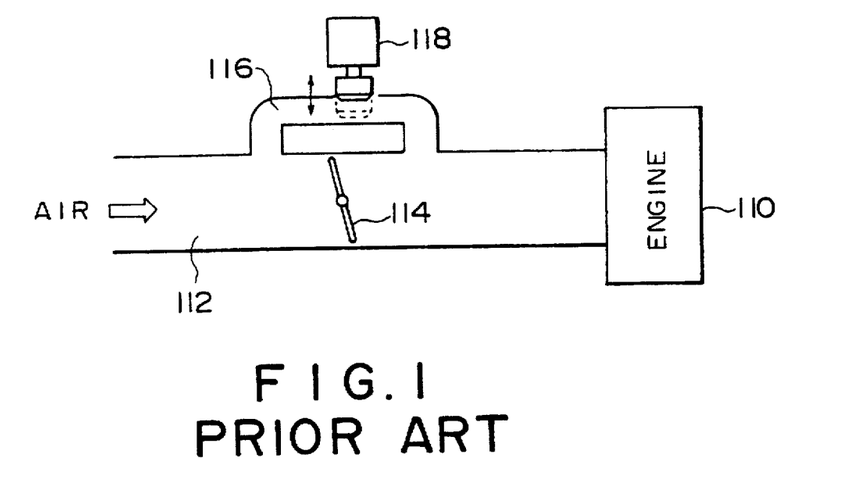
FIG. 1 is a schematic explanatory view illustrating a conventional ISC system of a bypass air system.
Figure 2:
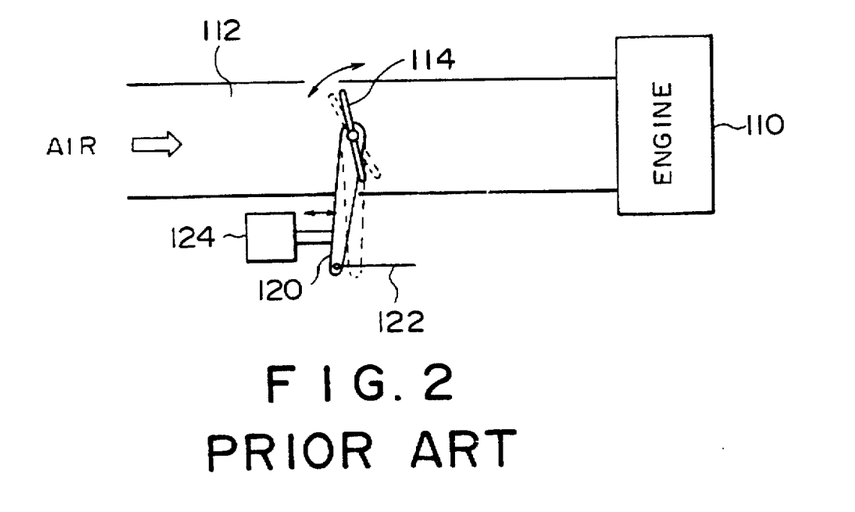
FIG. 2 is a schematic explanatory view illustrating a conventional ISC of a throttle-valve direct-acting system.

A typical ISC system performs an engine speed feedback control by comparing an actual engine speed with a target idle speed, which is preset in accordance with a load against engine rotation, and by adjusting the intake air flow so that the actual engine speed is equal to the target idle speed in accordance with the difference between both speeds. Conventional ISC systems may be divided roughly into two types, one being a bypass air system which controls the air flow bypassing a throttle valve, and the other being a throttle-valve direct-driving system which controls the position of a throttle valve at idling. Referring to FIGS. 1 and 2, these systems will be described below.

FIG. 1 is a schematic explanatory view functionally illustrating an ISC system of a bypass air system. As shown in FIG. 1, an intake air passage 112 is provided on the intake air side of an automotive internal combustion engine 110. The intake air passage 112 is provided with a bypass air passage 116 bypassing a throttle valve 114.

The bypass air passage 116 is provided with an actuator 118 for optionally varying an open area s of the passage. The actuator 118 is, e.g., a step motor type or a linear solenoid type actuator. The actuator 118 is driven in response to a control signal outputted from a control section (not shown) in accordance with the difference between an actual engine speed and a target idle speed.

For example, in a case where the actual engine speed is lower than the target idle speed during idling, the actuator 118 increases the open area s in accordance with the difference between both speeds, so that the intake air flow of the engine increases and the engine speed increases by the difference between both speeds. On the other hand, in a case where the actual engine speed is higher than the target idle speed, the actuator 118 decreases the open area s in accordance with the difference between both speeds to decrease the intake air flow to decrease the engine speed by the difference between both speeds. Therefore, the engine speed is maintained to the target idle speed, so that the engine 110 can accomplish a stable idling.

FIG. 2 is a schematic explanatory view illustrating an ISC system of a throttle-valve direct-driving system. The detailed descriptions of the same elements as those of FIG. 1 are omitted by using the same reference numbers. As shown in FIG. 2, a throttle valve 114 is provided with a throttle lever 120 for adjusting the open angle of the throttle valve 114. The throttle lever 120 is connected to a throttle wire 122 linked to a gas pedal (not shown). The throttle valve 114 has a return spring (not shown) and is always biased toward a closed position.

The throttle lever 120 is provided with an actuator 124 which can change the closed position of the throttle valve 114 in accordance with the difference between an actual engine speed and a target idle speed. Thus, the gap between the intake air passage 112 and the throttle valve 114 is adjusted to vary the intake air flow sucked into the engine so that the engine speed is adjusted so as to be equal to the target idle speed.

As mentioned above, all of the conventional ISC systems are designed to adjust the intake air flow sucked into the engine by adjusting the area, through which the air in the intake air passage 112 passes. Therefore, in order to carry out the ISC, actuators 118 and 124 must be separately provided near the throttle valve. In the case of the bypass air system, the bypass passage 116 must be also provided. In addition, in order to drive the actuators 118 and 124 in accordance with the engine operation state, a complicated control must be performed.

Moreover, the actuator 118 of the ISC system of the aforementioned bypass air system controls the intake air flow for the ISC only at an operating speed of the actuator 118. Therefore, it takes a predetermined time until the operation of the actuator 118 is completed, so that it is not possible to accomplish the quick responsibility of control.

In addition, since the actuator 124 of the throttle-valve direct-driving system controls the throttle position against the biasing force of the return spring (not shown), a throttle return mechanism having a large operating force and a low operating speed is generally used. Therefore, the operating speed of the actuator is low due to the throttle return mechanism, so that it is difficult to accomplish the quick responsibility of the ISC.

In addition, the conventional ISC system is provided near the throttle valve 114, and the throttle valve 114 is in communication with the engine 110 via an intake manifold and so forth, so that the throttle valve 114 is spaced from the engine 110 by a predetermined distance. Therefore, it must take a predetermined time until the adjusted intake air is sucked into the engine 110, so that there is a problem in that the responsibility of the ISC is poor.

SUMMARY OF THE INVENTION

It is therefore an object of the present invention to eliminate the aforementioned problems and to provide an idle speed control system for an automotive internal combustion engine, which does not need any ISC systems provided in a conventional idle speed control system for carrying out the ISC, and which can immediately adjust an engine speed varying in accordance with an engine loaded condition during idling, to a target idle speed.

The present invention is based on a system for carrying out the opening/closing control of an intake/exhaust valve by means of an actuator using electromagnetic means, in place of conventional valve driving mechanisms comprising a cam shaft and so forth. That is, the present invention is made so that the opening and closing timings of an intake/exhaust valve, which is electrically open and closed using an electromagnetic actuator, can be freely set.

In conventional valve moving mechanisms using a cam shaft, the opening/closing operation of an intake/exhaust valve is linked to a crank shaft of an internal combustion engine, so that the opening and closing timings thereof are always constant with respect to the position of a piston of the engine and can not be freely set. In addition, in recent years, although variable valve driving mechanisms, which can change the timing by shifting the phase of a cam shaft on the basis of the running condition or which can change the lifted quantity, have been developed, there is a structural limit to change them.

However, it has been now possible to optionally set the opening and closing timings by electrically driving an intake/discharge valve using an electromagnetic actuator. Therefore, according to the present invention, the engine speed during idling is controlled by means of an electromagnetic actuator which can optionally set the opening and closing timings of an intake/discharge valve in accordance with the operating state of an automotive internal combustion engine.

In order to accomplish the aforementioned and other objects, an idle speed control system for an automotive internal combustion engine, according to the present invention, is designed to increase or decrease the intake air flow of the engine to adjust the engine speed by changing at least one of the valve opening timing and the valve closing timing of an intake/exhaust valve in accordance with the engine loaded condition during idling.

Therefore, it is possible to directly and quickly change the intake air flow sucked into the engine, and to improve the responsibility of the idle speed control. In addition, since the engine speed is controlled during idling, it is not required to provide additional actuators and bypass passages, so that it is possible to simplify the control and decrease the number of parts to reduce the costs.

As mentioned above, according to the present invention, it is not required to carry out the conventional complicated control for the ISC and to provide the system therefor, so that it is possible to greatly decrease the costs. In addition, since the intake air flow sucked into the combustion chamber can be directly controlled when adjusting the intake air flow of the engine, it is possible to quickly change the engine speed due to the quick responsibility, so that it is possible to effectively carry out the ISC.

DESCRIPTION OF THE PREFERRED EMBODIMENTS

Referring now to the accompanying drawings, the preferred embodiments of the present invention will be described below.

Figure 3:
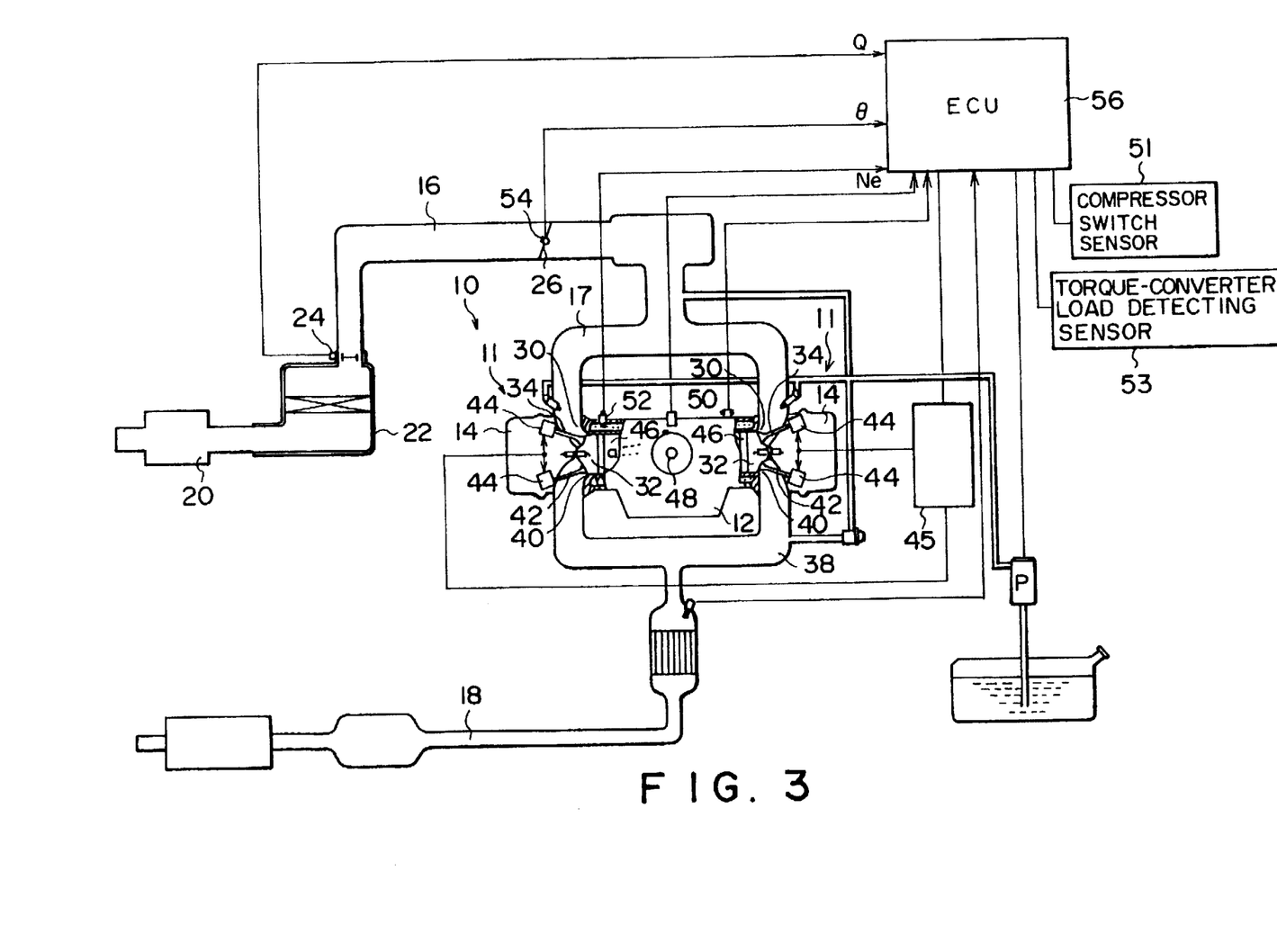
FIG. 3 is a schematic view illustrating the whole construction of an automotive internal combustion engine, to which an idle speed control system of the present invention is applied.

FIG. 3 is a schematic view illustrating the whole construction of an automotive internal combustion engine, e.g., a four-cycle engine, to which an idle speed control system of the present invention is applied.

A horizontally opposed type engine 10 comprises a cylinder portion 12 having a plurality of cylinders 11, a cylinder head portion 14, an intake passage 16, and an exhaust passage 18. The intake passage 16 has an intake chamber 20, an air cleaner 22 for removing dust in air, an air flow meter 24 for detecting an intake air flow Q, and a throttle valve 26 for adjusting the intake air flow Q in accordance with the operated quantity of a gas pedal (not shown), in the order from the upstream.

Intake manifolds 17 branches from the intake passage 16 at the downstream thereof. Each of the downstream ends of the intake manifolds 17 is in communication with a combustion chamber 32 of the respective cylinder 11 via an intake port 30. The intake port 30 is provided with an intake valve 34 which can be open and closed at a given timing. The exhaust passage 18 is in communication with the combustion chambers 32 of the respective cylinders 11 via exhaust ports 40 by means of exhaust pipes 38, respectively. Each of the exhaust ports 40 is provided with an exhaust valve 42 which can be open and closed at a given timing. The intake valve 34 and the exhaust valve 42 are open when moving toward the combustion chambers 32 and closed when moving the opposite direction thereto, so as to establish and block the communication between the combustion chamber 32 and the intake port 30 or the exhaust port 40.

The cylinder head portion 14 is provided with an electromagnetic actuator 44 for each of the intake valves 34 and the exhaust valves 42. The electromagnetic actuator 44 is a solenoid type actuator, which is electrically turned on and off and which is driven by a valve driving unit 45 to open and close the corresponding one of the intake valves 34 and exhaust valves 44.

The cylinder portion 12 is provided with a crank angle sensor 50 for detecting the position of a piston 46 (a crank angle position) and an engine speed Ne, and a coolant temperature sensor 52 for detecting the temperature of the coolant for the engine 10. The throttle valve 26 is provided with a throttle position sensor 54 for detecting a throttle position θ.

As various sensors, there are provided a compressor switch sensor 51 for detecting the presence of compressor load applied to an air conditioner (not shown) serving as an engine loaded apparatus, and a torque-converter load detecting sensor 53 for detecting the load of an automatic transmission (not shown). There is also provided an electronic control unit (which will be hereinafter referred to as an "ECU") 56 for inputting the signals detected by the respective sensors and for outputting control signals to the respective control means for controlling the engine operation.

Figure 4:
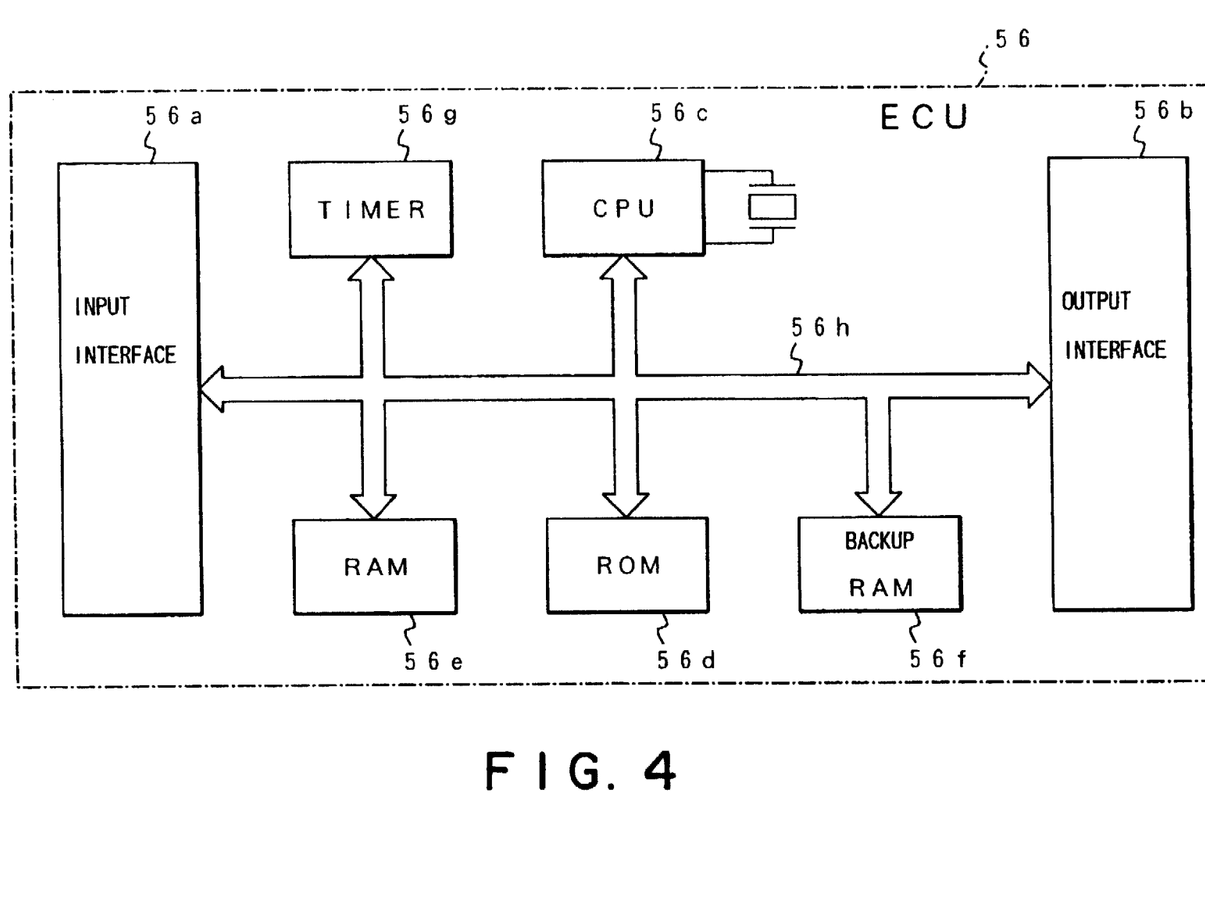
FIG. 4 is a block diagram of the internal construction of an ECU 56 shown in FIG. 3.

FIG. 4 is a block diagram of the internal construction of the ECU 56 shown in FIG. 3. As shown in FIG. 4, the ECU 56 is formed as an microcomputer system which comprises: an input interface 56a for inputting the signals detected by the respective sensors; an output interface 56b for outputting control signals to the respective control means; a CPU 56c serving as a main processor; a ROM 56d in which control programs and preset fixed data are stored; a RAM 56e for storing therein data after processing the signals from the respective sensors and data processed by the CPU 56c; a backup RAM 56f for storing therein learning data and so forth; a timer 56g; and so forth, wherein the respective elements are connected to each other by means of a bus line 56h.

Figure 5:
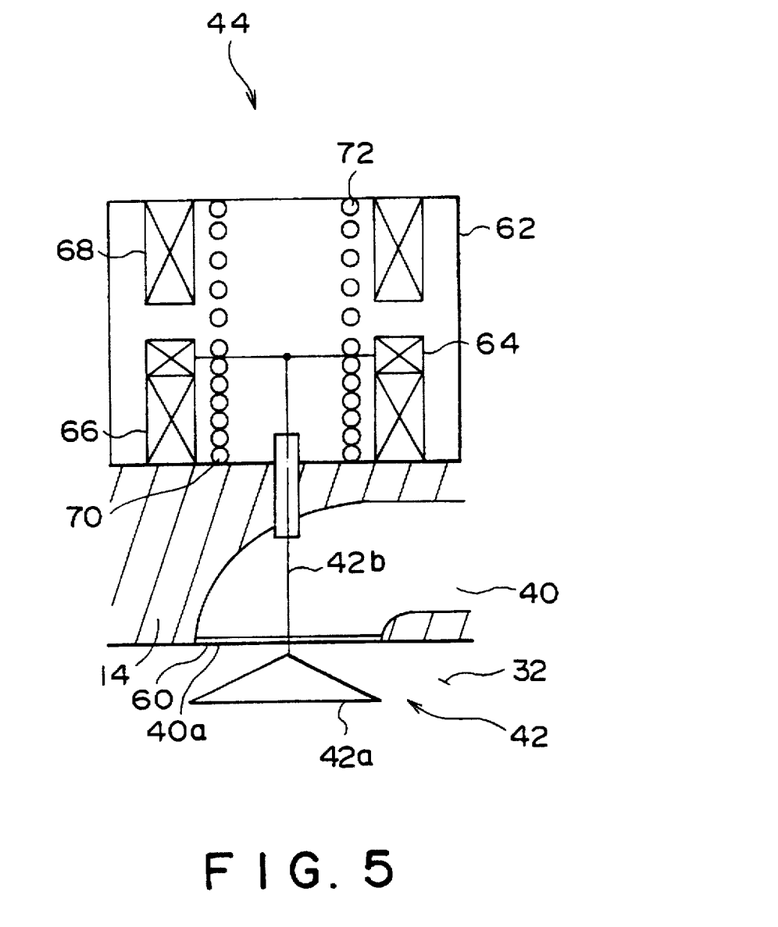
FIG. 5 is a schematic view of the internal construction of an actuator 44 for driving an exhaust valve 42 shown in FIG. 3.

FIG. 5 is a schematic explanatory view functionally illustrating the internal structures of the exhaust valve 42 shown in FIG. 3 and the actuator 44 for driving the exhaust valve 42. Furthermore, the detailed description of the intake valve 34 is omitted since it has the same structure as the exhaust valve 42. As shown in FIG. 5, the exhaust valve 42 comprises a valve portion 42a and a valve stem portion 42b, and is provided on the cylinder head portion 14 so as to be movable in vertical directions.

The valve portion 42a is formed so as to be capable of tightly contacting a valve sheet portion 60 provided at an opening periphery 40a of the exhaust port 40 formed in the cylinder head portion 14 when the exhaust valve 42 is moved upwards. An movable element 64 of a magnetic material is connected to the top portion of the valve stem portion 42b. The movable element 64 is housed in a casing 62 of the actuator 44 which is provided at the top of the cylinder head portion 14.

The casing 62 houses therein a valve opening coil 66 and a valve closing coil 68, which are arranged on the upper and lower sides of the movable element 64 so that the movable element 64 can move in a vertical direction between the coils 66 and 68. Inside of the valve opening coil 66 and on the outer periphery of the valve stem portion 42a, a valve closing spring 70 for always biasing the exhaust valve 42 in a valve closing direction (upwards in the drawing) is provided. Inside of the valve closing coil 68 and on the opposite side of the movable element 64 to the valve closing spring 70, a valve opening spring 72 for biasing the exhaust valve 42 in a valve opening direction (downwards in the drawing) is provided.

Figure 6:
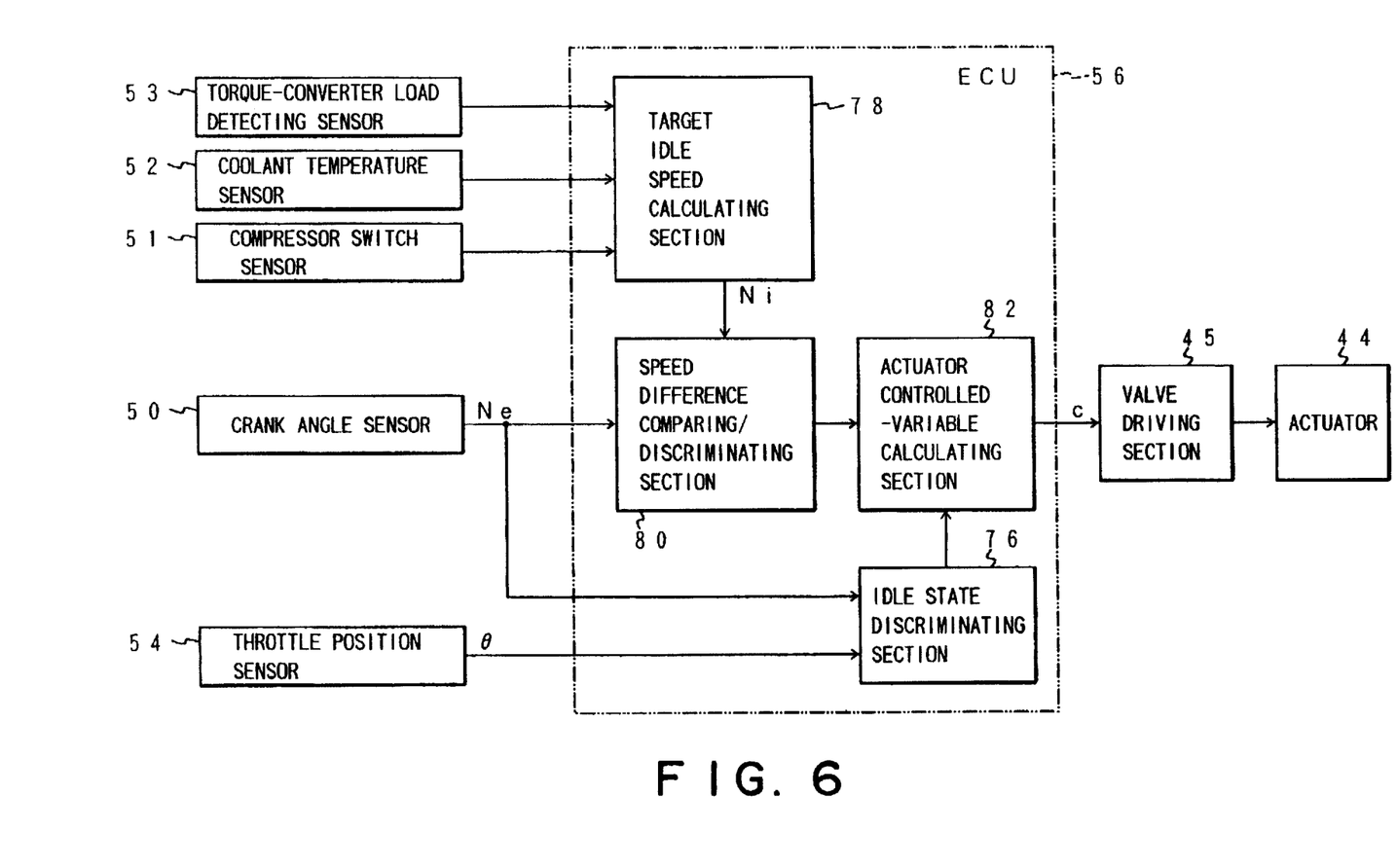
FIG. 6 is a functional block diagram of the preferred embodiment of a control system according to the present invention.

FIG. 6 is a functional block diagram of the preferred embodiment of a control system according to the present invention. As shown in FIG. 6, the ECU 56 includes therein an idle state discriminating section 76, a target idle-speed calculating section 78, a speed-difference comparing and discriminating section 80, and an actuator controlled-variable calculating section 82.

The idle state discriminating section 76 determines whether the current engine operation state is the idling state, on the basis of the signals detected by the throttle position sensor 54 and the crank angle sensor 50. The target idle-speed calculating section 78 inputs the detected signals of the compressor switch sensor 51, the coolant temperature sensor 52 and the torque converter load detecting sensor 53, and calculates a target idle speed Ni which is preset in accordance with the loaded condition.

The speed-difference comparing and discriminating section 80 compares an actual engine speed Ne detected by the crank angle sensor 50 with the calculated target idle speed Ni to calculate a speed difference.

The actuator controlled-variable calculating section 82 calculates a controlled variable of the actuator 44 on the basis of the discriminated results of the idle-state discriminating section 76 and the speed-difference comparing and discriminating section 80, to output a control signal c. The valve driving section 45 causes electric current to pass through the actuator 44 in accordance with the control signal c to control the opening and closing of the intake valve 34 and the exhaust valve 42.

Figure 7A:
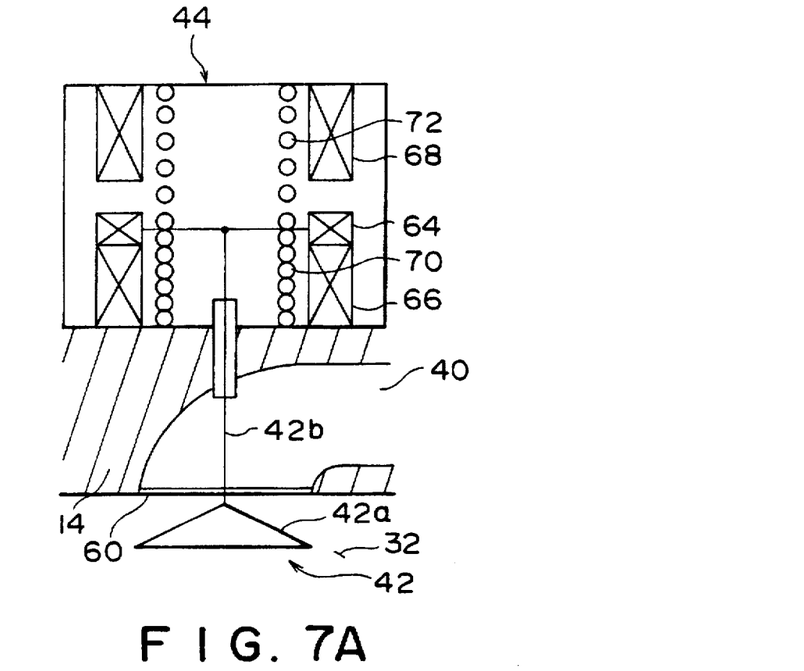
FIGS. 7A and 7B are explanatory views schematically illustrating the state of an exhaust valve 42 when the electricity passes through the actuator 44.
Figure 7B:
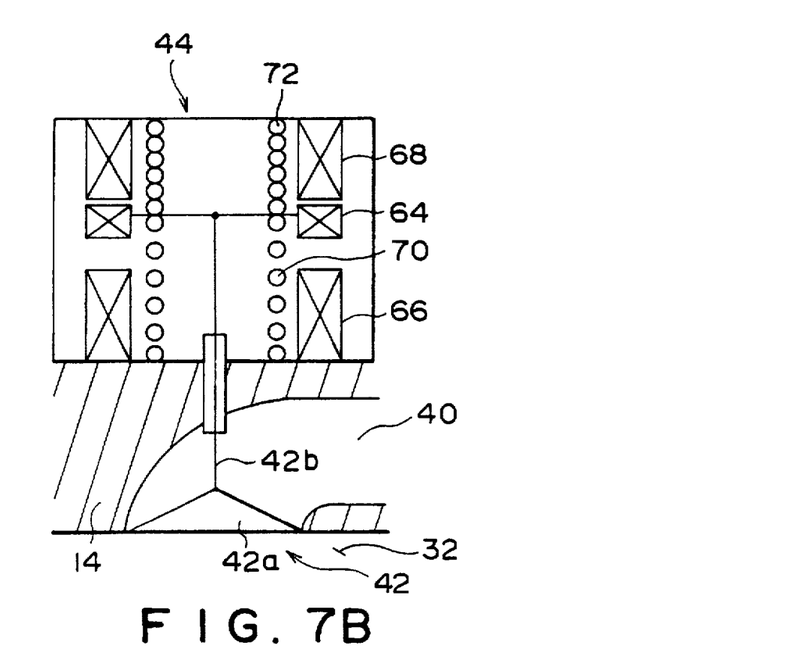

Referring to FIGS. 7A and 7B, the operation of the electromagnetic intake/exhaust valve actuator 44 serving as a basic element of the present invention will be described. FIGS. 7A and 7B are explanatory views schematically illustrating the state of the exhaust valve 42 when electric current passes through the actuator 44, wherein FIG. 7A shows a valve open state of the exhaust valve 42, and FIG. 7B shows a valve closed state of the exhaust valve 42. Furthermore, the detailed description of the intake valve 34 is omitted since it has the same structure as that of the exhaust valve 42.

As shown in FIG. 7A, in a case where the valve driving section 45 (see FIG. 6) causes electric current to pass through the valve opening coil 66 on the basis of the control signal c from the ECU 56, the valve opening coil 66 attracts the movable element 64 against the biasing force of the valve closing spring 70 by the exciting force of the valve opening coil 66. Therefore, the exhaust valve 42 projects into the combustion chamber 32, so that the valve portion 42a is separated from the valve sheet portion 60 to establish the communication between the combustion chamber 32 and the exhaust port 40.

As shown in FIG. 7B, in a case where electric current passes through the valve closing coil 68, the valve closing coil 68 attracts the movable element 64 against the biasing force of the valve opening spring 72 by the exciting force of the valve closing coil 68 to move the exhaust valve 42 upwards. Therefore, the valve portion 42a is closed by the valve sheet portion 60 to block the communication between the combustion chamber 32 and the exhaust port 40.

As mentioned above, the actuator 44 controls the opening and closing of the intake valve 34 and the exhaust valve 42 when the valve driving section 45 causes electric current to pass through either the valve opening coil 66 or the valve closing coil 68.

Figure 8:
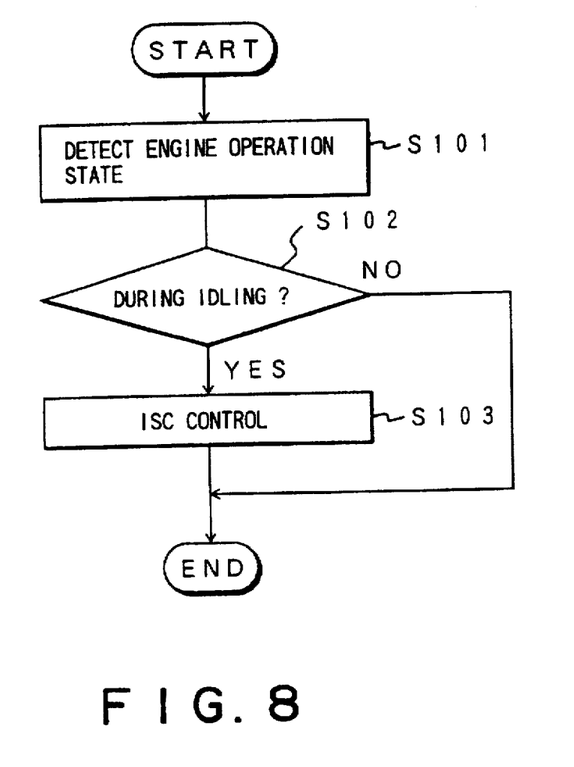
FIG. 8 is a flow chart for determining as to whether the current engine operating state is a state for performing the ISC.
Figure 9:
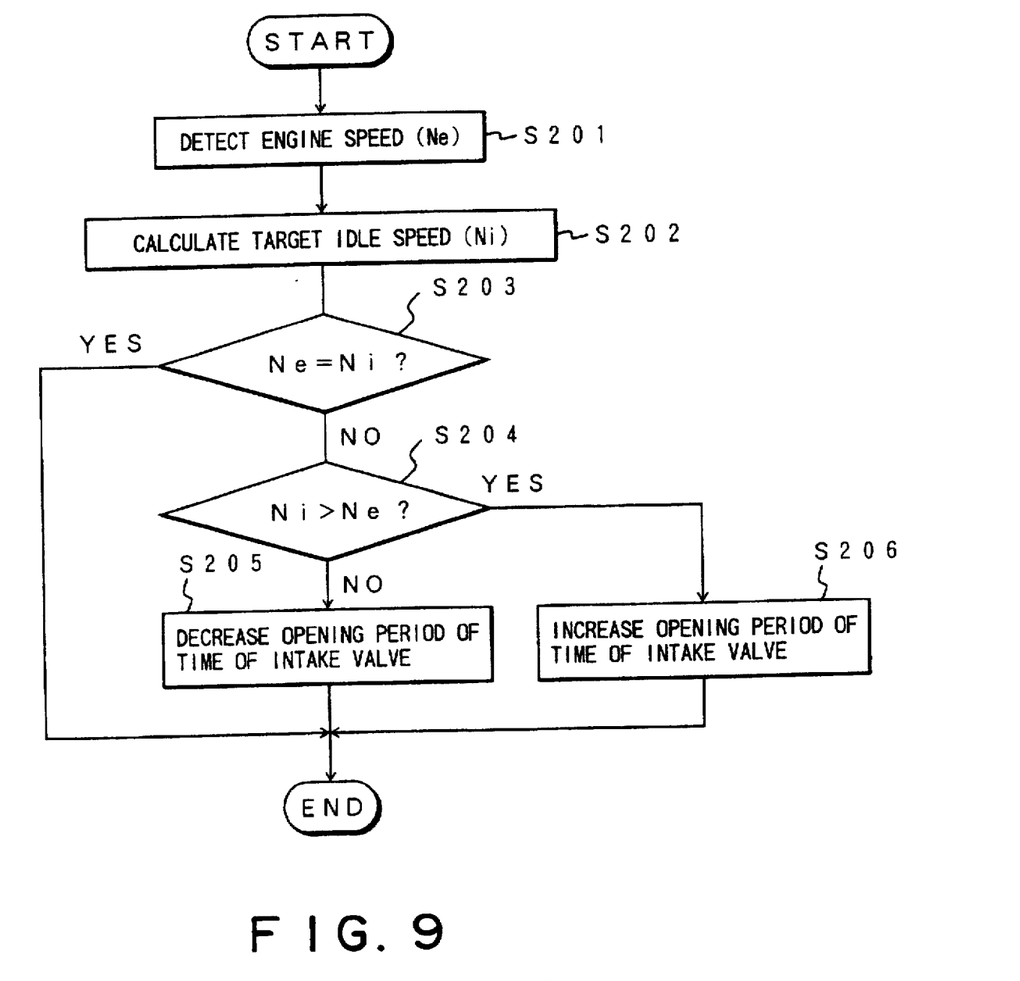
FIG. 9 is a flow chart illustrating a subroutine for controlling the ISC at step S103 of FIG. 8.
Figure 10:
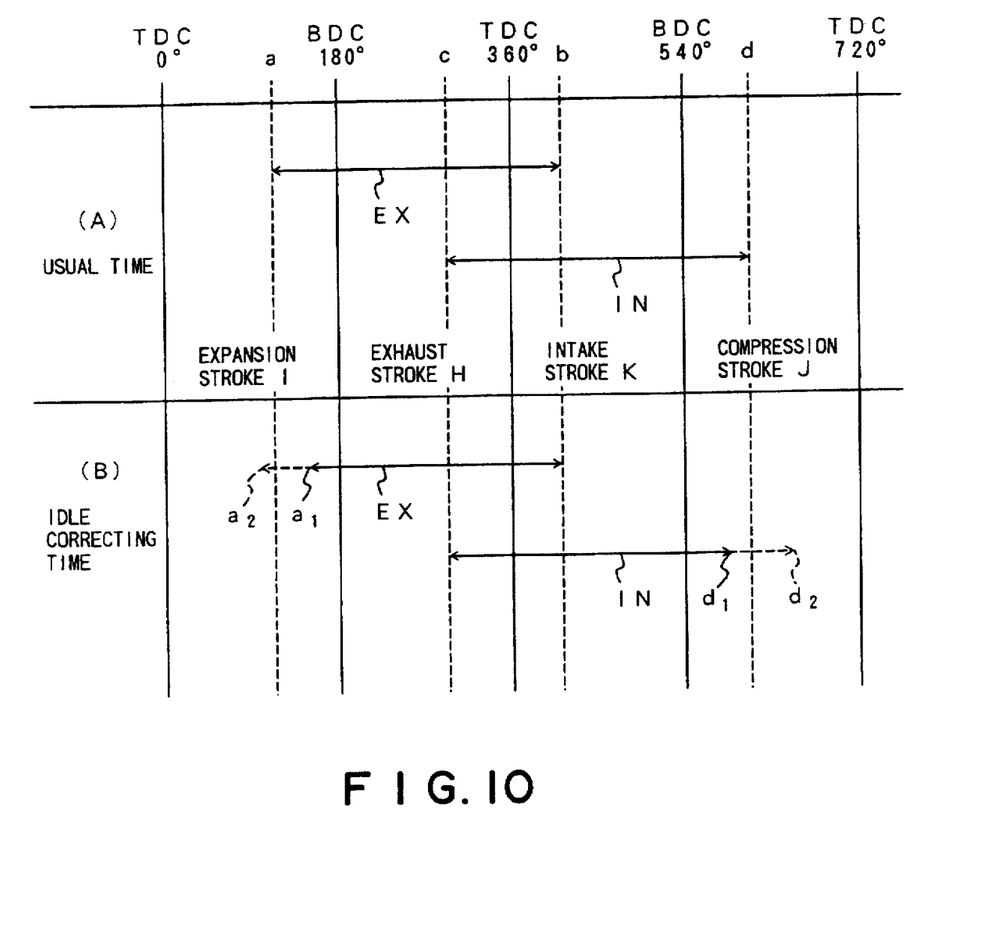
FIG. 10 is a time chart showing the relationship between the position of a piston 46 with respect to a cylinder portion 12 and the opening and closing timings of an intake valve 34 and an exhaust valve 42.

Referring to FIGS. 8-10, a method for controlling the ISC system for an automotive internal combustion engine, according to the present invention, will be described below. Furthermore, in this preferred embodiment, the ISC is carried out by changing the opening and closing timings of the intake valve 34.

FIG. 8 is a flow chart for determining whether the current engine operating state is a state for performing the ISC. First, at step 101, the engine operating state is detected using the actual engine speed Ne detected by the crank angle sensor 50 and the throttle position θ detected by the throttle position sensor 54.

At step 102, it is determined whether the engine operating state detected at step 101 is the idling state. That is, in a case where the throttle position θ is a fully closed position and the actual engine speed Ne is less than a predetermined value, it is determined that the engine 10 is in the idling state. When it is determined that the engine 10 is in the idling state (YES), the routine goes to step 103 for carrying out the ISC, and when it is determined that the engine 10 is not in the idling state (NO), the routine ends (END) so that the ISC is not carried out.

FIG. 9 is a flow chart illustrating a subroutine for controlling the ISC at step S103 of FIG. 8. At step 201, the actual engine speed Ne is detected using the detected signal of the crank angle sensor 50 and is temporarily stored in the RAM 56e of the ECU 56.

Then, at step 202, the target idle speed Ni is calculated. The target idle-speed calculating section 78 (see FIG. 6) calculates the target idle speed Ni from the signals detected by the compressor switch sensor 51, the coolant temperature sensor 52 and the torque-load indicative signal detecting sensor 53, using a map set in the ROM 56d of the ECU 56.

Then, at step 203, it is determined whether the actual engine speed Ne stored in the RAM 56e at step 201 is equal to the target idle speed Ni calculated at step 202. When it is determined that these speeds are equal to each other(YES), the routine ends (END), since the engine 10 operates in the idling state at an appropriate engine speed corresponding to the engine loaded condition so that it is not required to carry out the ISC. When it is determined that these speeds are not equal to each other (NO), the routine goes to step 204 wherein the actual engine speed Ne is adjusted so as to be equal to the target idle speed Ni.

At and after step 204, the actual engine speed Ne is changed. At step 204, it is determined whether the actual engine speed Ne is higher than the target idle speed Ni, and the difference between both speeds is calculated. When it is determined that the actual engine speed Ne is higher than the target idle speed Ni (NO), the routine goes to step 205 wherein the actual engine speed Ne is decreased by the difference between both speeds.

When it is determined that the actual engine speed Ne is lower than the target idle speed Ni (YES), the routine goes to step 206 wherein the actual engine speed Ne is increased by the difference between both speeds. At step 205, the valve opening period of time is decreased by changing the opening and closing timings of the intake valve 34, while at step 206, the valve opening period of time is increased by changing the opening and closing timings of the intake valve 34.

Referring to FIG. 10, the increase and decrease of the valve opening period of time performed at steps 205 and 206 will be described below.

FIG. 10 is a time chart showing the relationship between the position of the piston 46 with respect to the cylinder portion 12 and the opening and closing timings of the intake valve 34 and the exhaust valve 42, in expansion stroke I, exhaust stroke H, intake stroke K and compression stroke J of the engine 10. In FIG. 10, IN denotes a valve opening period of time 1 of the intake valve 34, and EX denotes a valve opening period of time m of the exhaust valve 42. In addition, the position of the piston 46 with respect to the cylinder portion 12 is expressed by the crank angle.

First, referring to FIG. 10A, the opening and closing timings of the intake valve 34 when the ISC is not carried out, i.e., when the actual engine speed Ne is equal to the target idle speed Ni (YES at step 203 in FIG. 9) (which will be hereinafter referred to as a "usual time") will be described. As shown in FIG. 10A, the intake valve 34 is led to be open at a point (point c in the drawing) in the second half of the exhaust stroke H of the engine 10, i.e., slightly before the piston 46 reaches the top dead center (hereinafter referred to as "TDC") (360°) after the exhaust stroke.

The intake valve 34 is closed at a point (point d in the drawing) after the intake stroke K is completed and slightly after the compression stroke J is started, i.e., slightly after the piston 46 reaches the bottom dead center (hereinafter referred to as "BDC") (540°) after the intake stroke.

Referring to FIG. 10B, the opening and closing timings of the intake valve 34 when the actual engine speed Ne is different from the target idle speed Ni (NO at step 203 in FIG. 9) (which will be hereinafter referred to as an "idle correcting time") will be described below.

When the actual engine speed Ne is higher than the target idle speed Ni (NO at step 204), the valve closing completed timing of the intake valve 34 is advanced toward the BDC (540°) in accordance with the difference between speeds calculated at step 204 (point d1 in the drawing). Therefore, the opening period of time 1 of the intake valve 34 is decreased by a period of time corresponding to the difference between both speeds, so that the intake air flow sucked into the combustion chamber 32 is decreased. As a result, the actual engine speed Ne decreases so as to be equal to the target idle speed Ni.

When the actual engine speed Ne is lower than the target idle speed Ni (YES at step 204), the valve closing completed timing of the intake valve 34 is delayed toward the TDC (720°) in accordance with the difference between speeds (point d2 in the drawing). Therefore, the opening period of time 1 of the intake valve 34 is extended by a period of time corresponding to the difference between speeds, so that the intake air flow sucked into the combustion chamber 32 is increased. As a result, the actual engine speed Ne increases so as to be equal to the target idle speed Ni.

As mentioned above, the intake air flow sucked into the combustion chamber 32 can be directly controlled by changing the valve closing completed timing of the intake valve 34 at steps 205 and 206, so that it is possible to improve the responsibility of the ISC even though the engine loaded condition varies. Then, the routine ends (END).

In this preferred embodiment, while the ISC has been carried out by increasing or decreasing the valve opening period of time of the intake valve 34, the ISC may be carried out by increasing or decreasing the valve opening period of time of the exhaust valve 42 as another preferred embodiment.

For example, when the actual engine speed Ne is higher than the target idle speed Ni (NO at step 204) at idling, the valve closing completed timing of the exhaust valve 42 is maintained (point b in the drawing), and the valve opening starting timing is delayed in accordance with the difference between speeds calculated at step 204 (point a1 in the drawing). In addition, in a case where the actual engine speed Ne is lower than the target idle speed Ni (YES at step 204), the valve opening starting timing is advanced in accordance with the difference between speeds (point a2 in the drawing).

Thus, the valve opening period of time m of the exhaust valve 42 is increased or decreased by a period of time corresponding to the difference between speeds to increase or decrease the intake air flow sucked into the combustion chamber 32, so that the actual engine speed Ne is equal to the target idle speed Ni.

As mentioned above, it is possible to quickly adjust the actual engine speed Ne so as to be equal to the target idle speed Ni by changing the opening and closing timings of the intake valve 34 and the exhaust valve 42 in accordance with the engine loaded condition during idling, so that it is possible to maintain an appropriate idle speed.

While the presently preferred embodiment of the present invention has been shown and described, it is to be understood that this disclosure is for the purpose of illustration and that various changes and modification may be made without departing from the scope of the invention as set forth in the appended claims.

What is claimed is:

1. An idle speed control system for an automotive internal combustion engine which has an intake/exhaust valve control system for electromagnetically operating an intake valve and an exhaust valve, said idle speed control system comprising:

target idling speed calculating means for calculating a target idling speed based on engine operating conditions; and valve timing changing means for changing an opening period of time of at least one of said intake valve and said exhaust valve so as to maintain the engine speed at said calculated target idling speed during idling.

2. An idle speed control system as set forth in claim 1, wherein said valve timing changing means is adapted to shorten said opening period of time of said intake valve by advancing a timing to close said intake valve so as to decrease the engine speed toward said target idling speed.

3. An idle speed control system as set forth in claim 1, wherein said valve timing changing means is adapted to extend said opening period of time of said intake valve by delaying a timing to close said intake valve so as to increase the engine speed toward said target idling speed.

4. An idle speed control system as set forth in claim 1, wherein said valve timing changing means is adapted to shorten said opening period of time of said exhaust valve by delaying a timing to open said exhaust valve so as to decrease the engine speed toward said target idling speed.

5. An idle speed control system as set forth in claim 1, wherein said valve timing changing means is adapted to extend said opening period of time of said intake valve by advancing a timing to open said exhaust valve so as to increase the engine speed toward said target idling speed.

6. An idle speed control system for an automotive internal combustion engine which has an intake/exhaust valve control system for electromagnetically operating an intake valve and exhaust valve, said idle speed control system comprising:

idling determining means for determining whether said engine operates in an idling state;

engine loaded-condition detecting means for detecting a loaded condition of said engine when said idling state is determined;

target idling speed calculating means for calculating a target idling speed based on said detected loaded condition;

speed difference discriminating means for comparing said calculated target idle speed with a detected actual engine speed to calculate a difference therebetween; and valve timing changing means for changing an opening period of time of at least one of said intake valve and said exhaust valve so as to maintain the engine speed at said calculated target idling speed during idling.

* * * * *